(No Model.)
D. GENESE.
SUPPOSITORY MACHINE.
No. 554,178.  Patented Feb. 4, 1896.
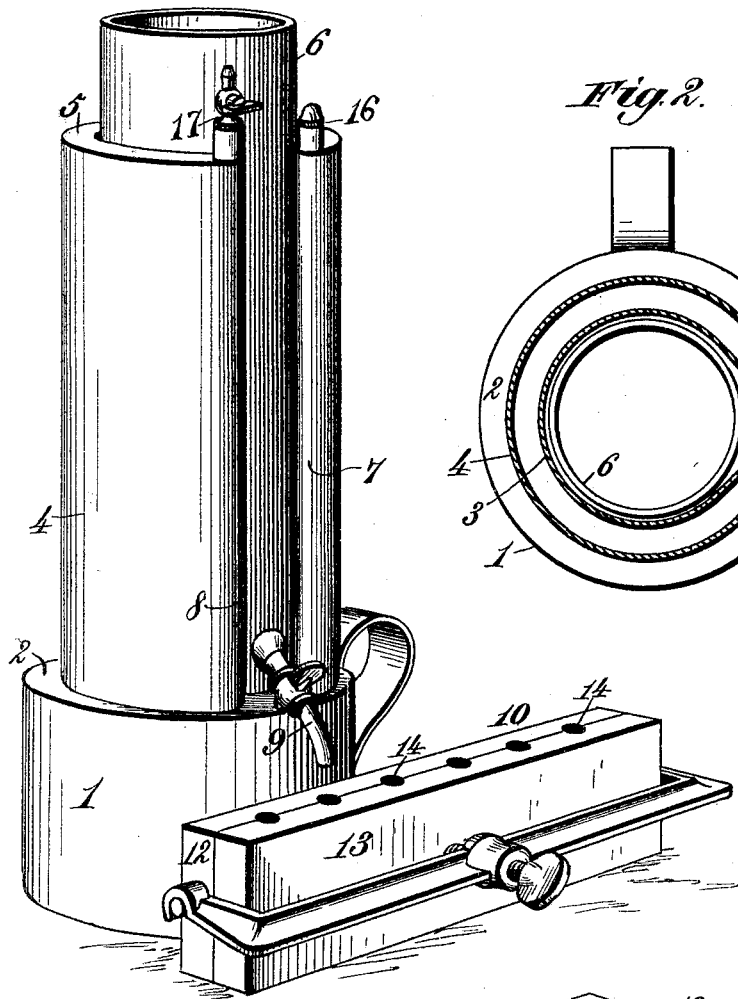
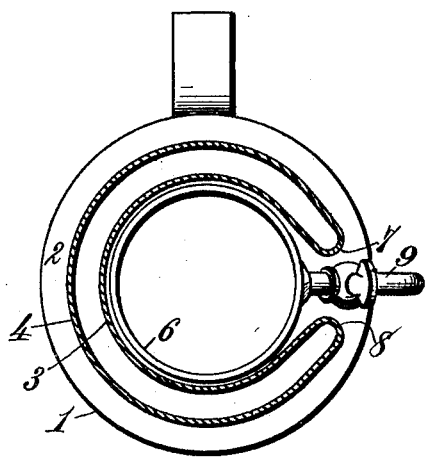
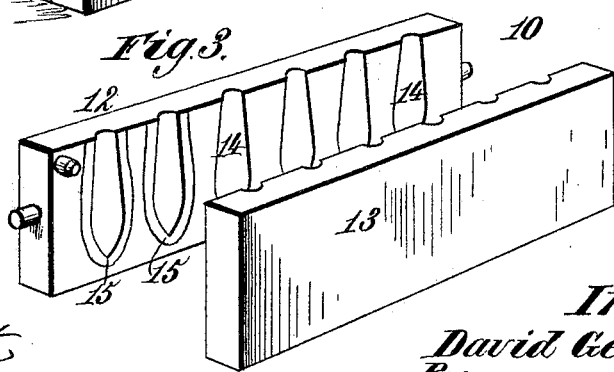
Witnesses.
Robert Everett.
Geo. W. Rea.
Inventor
David Genese,
By James L. Norris.
Atty.

UNITED STATES PATENT OFFICE.

DAVID GENESE, OF BALTIMORE, MARYLAND, ASSIGNOR, BY DIRECT AND MESNE ASSIGNMENTS, TO THE GENESE COMPRESSOR AND MOULDING MACHINE COMPANY OF BALTIMORE CITY, OF MARYLAND.

SUPPOSITORY-MACHINE.

SPECIFICATION forming part of Letters Patent No. 554,178, dated February 4, 1896.

Application filed May 23, 1895. Serial No. 550,445. (No model.)

*To all whom it may concern:*

Be it known that I, DAVID GENESE, a citizen of the United States, residing at Baltimore city and State of Maryland, have invented new and useful Improvements in Apparatus for Manufacturing Suppositories, &c., of which the following is a specification.

In an application for patent of even date herewith, Serial No. 550,444, I describe protecting-integuments for suppositories and analogous articles, which possess the desirable and useful characteristic of effectually preserving the molded form and efficacy of the suppositories, while affording increased facilities for their swift and entire removal whenever the articles are to be applied to the purpose for which they were produced.

In the manufacture of the suppositories from a glycerine or other composition adapted to be molded into the definite form or shape desired the mass of material should be maintained in a heated semi-fluid condition to facilitate the introduction thereof into the suppository-molds, each of which at the time contains as a lining the two sections designed to serve as the protecting-integument before mentioned; and to accomplish this object or purpose in an efficient manner and by a simple apparatus or device which is susceptible of being economically manufactured and practicably used or worked at little expense is the chief object of the invention constituting the subject-matter of my present application.

The invention consists essentially in an apparatus for maintaining in a heated fluid or semi-fluid condition a material for the preparation of suppositories or analogous articles, composed of a kettle or vessel surmounted by a substantially annular steam-chamber communicating therewith, said chamber having a vertical opening in its walls through which the nozzle or spout of an inner cylindrical removable container may pass, said removable container being adapted to rest upon and be heated by the kettle or vessel and its vertical steam-chamber, and said steam-chamber being provided at its top with a suitable steam-escape.

The invention is illustrated by the accompanying drawings, in which—

Figure 1 is a perspective view of an apparatus constructed in accordance with my invention and showing a molding apparatus or device arranged in proper relation to the discharge faucet or spout. Fig. 2 is a horizontal sectional view through the longitudinally-slotted steam-chamber or hollow column, and Fig. 3 is a detail perspective view showing the two separable mold-sections, separated from each other to illustrate some of the protecting-integument sections arranged in position.

In order to enable those skilled in the art to make and use my invention, I will now describe the same in detail, referring to the drawings, wherein—

The numeral 1 indicates a liquid or water boiling kettle or vessel of any construction suitable for the purpose in hand, but which is here illustrated as cylindrical in form and slightly tapering. The kettle or vessel is provided with a top wall, 2, from which rises a steam-chamber or hollow column comprising inner and outer walls, 3 and 4, and a top wall 5. The lower end of the steam-chamber or hollow column is in open communication with the interior of the kettle or vessel, so that steam generated therein rises into the steam-chamber or hollow column for the purpose of heating the same and thereby transmitting heat to the medicament-container 6.

The steam-chamber or hollow column is preferably circular in cross-section, and it is so formed as to provide a vertical opening extending from its top edge to or near its lower end. The opposite edges 7 and 8 of the steam-chamber are shown rounded, and they are separated a sufficient distance apart to provide the vertical opening referred to and thus permit the free insertion and removal of a faucet or discharge nozzle or spout 9 applied to the lower end of the medicament-container 6.

The faucet or discharge nozzle or spout may be of any construction suitable for the purpose, and extends from the container 6 in an inclined position, so that the discharge extremity can be placed in proximity to the receiving-mouth of any one of the molds 10 in the separable mold-sections 12 and 13.

The medicament-container is preferably in the form of a cylinder and composed of glass, porcelain, or other vitreous material, which is heated by the radiation of heat induced by the steam in the steam-chamber or hollow column. The upper end of the medicament-container is illustrated as open or without a cover or lid, but obviously any suitable cover or lid adapted to be removed or replaced, or opened or closed, can be employed in connection with the container.

The mold-sections 12 and 13 may contain any suitable number of mold-cavities 14 of a form corresponding to the form or shape of the article which is to be produced. The form or shape illustrated is designed for producing the ordinary glycerine suppository, but obviously the configuration of the molds can be largely varied to produce articles of any desired shape.

The material from which the suppositories or analogous articles are to be made is placed in the cylindrical container 6, and the latter is introduced into the space partially surrounded by the inner wall, 3, of the steam-chamber or hollow column. The vertical opening in the walls of the steam-chamber or hollow column permits the faucet or discharge nozzle or spout 9 to project a suitable distance for supplying the molding device or apparatus with the material maintained in a fluid or semi-fluid condition in the container.

The upper end of the steam-chamber is provided with a steam-escape safety-valve 16, and with a suitable cock or faucet attachment 17, for supplying water to the interior of the steam-chamber and vessel 1.

My improved steam-heating apparatus is particularly designed for maintaining glycerine compositions or medicinal ingredients or preparations in an attenuated or semi-fluid condition for introduction into molds to produce suppositories; but I do not wish to be understood as confining myself to the manufacture of suppositories, as obviously the apparatus can be used for heating and maintaining various compositions, ingredients or substances in a fluid or semi-fluid condition, and delivering the same into collapsible tubes, vials, or any other receptacles.

By maintaining the glycerine composition or medicinal ingredients in a fluid or semi-fluid condition by heat transmitted from steam the compositions or medicinal ingredients will not be overheated or damaged, as is the case where a vessel containing the composition or medicinal ingredients is heated by a flame or by the direct action of heat from a fire.

The longitudinally-slotted portion of the steam-chamber or hollow column extends from the top thereof to or near its lower end, so that the faucet or discharge nozzle or spout can remain in position on the cylindrical container without interfering with the movement of the container into and out of the space partially surrounded by the walls of the steam-chamber or hollow column.

Having thus described my invention, what I claim is—

An apparatus for maintaining in a heated, fluid, or semi-fluid condition, a material for the preparation of suppositories, or analogous articles, consisting of a liquid-holding kettle or vessel, from the top wall of which rises a substantially annular steam-chamber communicating with the interior of the kettle or vessel and having a vertical opening in its walls, and a removable cylindrical container arranged in the steam-chamber, resting upon the top portion of the kettle or vessel, heated by the latter and said annular steam-chamber, and provided with a discharge faucet or nozzle arranged in the vertical opening of the steam-chamber and adapted to pass vertically through said opening when the container is removed or replaced, said steam-chamber having at its top portion a steam-escape, substantially as and for the purposes described.

In testimony whereof I have hereunto set my hand in presence of two subscribing witnesses.

DAVID GENESE.

Witnesses:
GEO. MCCAFFRAY,
CHAS. H. SHIPLEY.